US006878882B2

(12) United States Patent
Larkin

(10) Patent No.: US 6,878,882 B2
(45) Date of Patent: Apr. 12, 2005

(54) ELECTRICAL CABLE MOISTURE BARRIER WITH STRAIN RELIEF BRIDGE

(76) Inventor: Kevin B. Larkin, 231 Hidden Glen Dr., Scotts Valley, CA (US) 95066

( * ) Notice: Subject to any disclaimer, the term of this patent is extended or adjusted under 35 U.S.C. 154(b) by 90 days.

(21) Appl. No.: 10/353,797

(22) Filed: Jan. 28, 2003

(65) Prior Publication Data

US 2004/0055389 A1 Mar. 25, 2004

Related U.S. Application Data

(63) Continuation-in-part of application No. 10/251,904, filed on Sep. 19, 2002.

(51) Int. Cl.$^{7}$ .......................... H02G 15/007; F15L 5/02

(52) U.S. Cl. ................. 174/135; 174/74 R; 174/66 SS; 277/607

(58) Field of Search .......................... 174/66 SS, 74 R, 174/135; 277/602, 606, 607

(56) References Cited

U.S. PATENT DOCUMENTS

| | | | | | |
|---|---|---|---|---|---|
| 3,978,581 A | | 9/1976 | Miura | ...................... | 29/630 A |
| 4,323,727 A | * | 4/1982 | Berg | .......................... | 174/135 |
| 4,659,164 A | * | 4/1987 | Reuss | ......................... | 439/607 |
| 5,396,572 A | * | 3/1995 | Bradley et al. | ............... | 385/78 |
| 5,691,505 A | * | 11/1997 | Norris | ......................... | 174/51 |
| 5,713,748 A | * | 2/1998 | Mulvihill | ..................... | 439/98 |
| 5,724,730 A | | 3/1998 | Tanaka | ........................ | 29/868 |
| 5,780,774 A | | 7/1998 | Ichikawa et al. | ......... | 174/88 R |
| 5,926,952 A | | 7/1999 | Ito | ............................. | 29/883 |
| 6,257,920 B1 | * | 7/2001 | Finona et al. | ............... | 439/455 |
| 6,344,614 B1 | * | 2/2002 | Sutehall et al. | ........... | 174/74 R |
| 6,386,895 B1 | * | 5/2002 | Rehrig | ....................... | 439/191 |
| 6,426,462 B1 | * | 7/2002 | Mignon et al. | ........... | 174/65 R |
| 6,482,034 B2 | * | 11/2002 | Ozaki | ......................... | 439/585 |
| 6,504,099 B2 | * | 1/2003 | Huang | ...................... | 174/74 R |
| 6,573,454 B2 | * | 6/2003 | Fujiwara | .................. | 174/74 R |

* cited by examiner

*Primary Examiner*—Dean A. Reichard
*Assistant Examiner*—Adolfo Nino
(74) *Attorney, Agent, or Firm*—Johannes Scheeberger

(57) ABSTRACT

A moisture barrier is molded and/or glued around an exposed section of a conductor where a surrounding insulation layer is removed. A gap between the conductor and a surrounding insulation layer consequently terminates at the moisture barrier and moisture is prevented from creeping any further. The moisture barrier is preferably integrated in a wick dam of a test cord utilized in a telephone line-testing device. A strain relief bridge may be crimped with two metal sleeves on the remaining insulation layer laterally on both sides of the moisture barrier to bridge eventual external forces across the moisture barrier.

19 Claims, 13 Drawing Sheets

ELECTRICAL CABLE MOISTURE BARRIER WITH STRAIN RELIEF BRIDGE

CROSS REFERENCE

The present application is a continuation-in-part to the co pending U.S. patent application Ser. No. 10/251,904 titled "Electrical Cable Moisture Barrier" of Kevin B. Larkin, filed Sep. 19, 2002, which is hereby incorporated by reference.

FIELD OF INVENTION

The present invention relates to moisture barriers of electrical cables. More particular, the present invention relates to a combined moisture barrier and strain relief of an electrical test cord.

BACKGROUND

Corrosion of metallic conductors due to moisture is a well-known problem in electrical applications. Metal oxides that result from the corrosion have typically relatively low conductivity. In cases, where electricity is transmitted via mechanically connected conductors, moisture may cause the formation of insulating oxide layers in the interface of the conductors. In such cases, an unfavorable electrical resistance degrades the conductive path across the interface.

Moisture is a particular problem in the field of telephone line testing where precise measurements need to be taken under partially severe weather conditions. Measurement devices are thereby exposed to a variety of operational conditions including sudden temperature changes, rain, snow, sleet, etc. The measurement devices need to be configured to provide continuous measurement precision under such operational conditions.

A main part of electrical measurement devices is the test cord that commonly includes two separate cables that are connected with one end on terminals of the measurement device. The other ends are designed for a temporary connection with contacts at which measurements need to be performed. In applications such as telephone line testing devices, the test cable terminals are commonly within a hermetically sealed housing.

The individual cables of a test cord are usually made of tinsel wire at the ends of which lugs are crimped on to reliably connect the cables to the device's terminals. It has been observed that despite careful sealing of the device housing, corrosion still occurs inside the housing at the interface between the crimped lugs and the tinsel wire. This corrosion is particularly undesirable since it may impose a resistance in the test cord that degrades the over all measurement precision of the device. Therefore, there exists a need for a test cord that is configured to prevent moisture related corrosion in the interface between the crimped lugs and the tinsel wire. The present invention addresses this need.

Efficient mass production of electrical components often includes plastic molding. In so-called inserter molds conductors are placed together with eventual other prefabricated parts and a plastic material is molded around them. For example, U.S. Pat. No. 3,978,581 to Miura discloses a method of making a pin plug that involves the insert molding of a housing whereby pins and cables are fixedly embedded. The molded plastic provides thereby electrical insulation and structural support.

Similarly, U.S. Pat. No. 5,724,730 to Tanaka claims a method for protecting a conductive part of a flat cable. The conductors of a flat cable are inserted thereby together with the connected relay wires in a mold and a housing is molded around them that provides similarly to Miura electrical insulation and structural support.

In the U.S. Pat. No. 5,926,952 to Ito a pre-molded connector structure is provided that includes a core structure that fixedly holds a number of conductors that protrude all the way through the core structure. The core structure is made of plastic and provides structural support and electrical insulation.

Finally, in U.S. Pat. No. 5,780,774 to Ichikawa et al. a connector structure is disclosed, in which independent connectors are fixed in a conductive connection by molding an upper portion onto a prefabricated housing base. Again, the molding provides structural support and electrical insulation.

The interface between the test cord and the measurement device is exposed to mechanical strain as well. Bending and pulling forces need to be absorbed. At the same time, the interface needs to be sufficiently flexible to not inhibit the cable's movement range away from the measurement device.

SUMMARY

A discovered pathway for moisture is the gap between the conductive core and the surrounding insulation of an electric cable. In the case of a test cord, moisture may creep along this pathway from the peripheral contacts into the sealed housing of the measurement device where the conductors of the test cord terminate.

In the present invention, a barrier is molded along an exposed section of a cable such that a gap between the conductive core and the cable's insulation is interrupted. As a result, moisture may propagate along the gap only up to the molded barrier. The moisture barrier is preferably incorporated in cables exposed to severe operational conditions, as is the case for test cords of telephone line-testing devices.

The test cord is an independently fabricated component that is typically assembled in the measurement device before the device housing is put together. The test cord has an enlarged section commonly called wick dam. The wick dam fits with its outside shape into correspondingly shaped material separations of the device housing. Thus, when the test cord is assembled, the wick dam snugly fits and seals the hole through which the test cord's cable strings reach into the device housing. The wick dam is commonly molded or glued around the cable strings to provide structural support and to prevent cable damage.

Even though in prior art test cords, the housing opening is usually hermetically sealed by the wick dam, moisture may still creep along a gap between the cable strings' core and its surrounding insulation. In the present invention, the moisture barrier interrupts this remaining pathway. The moisture barrier is provided within the wick dam by removing the insulation layer along a certain length of the cable strings and consecutively embedding the exposed section directly in the wick dam. The molded and/or glued material of the wick dam snugly surrounds the core such that the gap between the insulation and the core terminates within the enlarged section.

Eventually, metal sleeves are crimped adjacent to the exposed section to provide a strain relief for the exposed section. Once the enlarged section is formed the metal sleeves are fixedly held within the enlarged section. Tensile and/or bending forces applied on the outside portion of the test cord are transmitted via the crimped sleeves onto the enlarged section and the device housing.

In a second embodiment, the metal sleeves are combined with a strain relief bridge such that a mechanical load received at one metal sleeve is directly transmitted onto the second metal sleeve while bridging over the moisture barrier. The bridging structure that connects directly the two metal sleeves is independently fabricated of the wick dams surrounding housing. The bridging structure may either be monolithically fabricated together with the sleeves or may be made of flexible members attached with each end at one of the metal sleeves.

In a third embodiment of the invention, the strain relief bridge is provided by nylon strings of a braided nylon layer of the cable.

DETAILED DESCRIPTION

Figure 1:
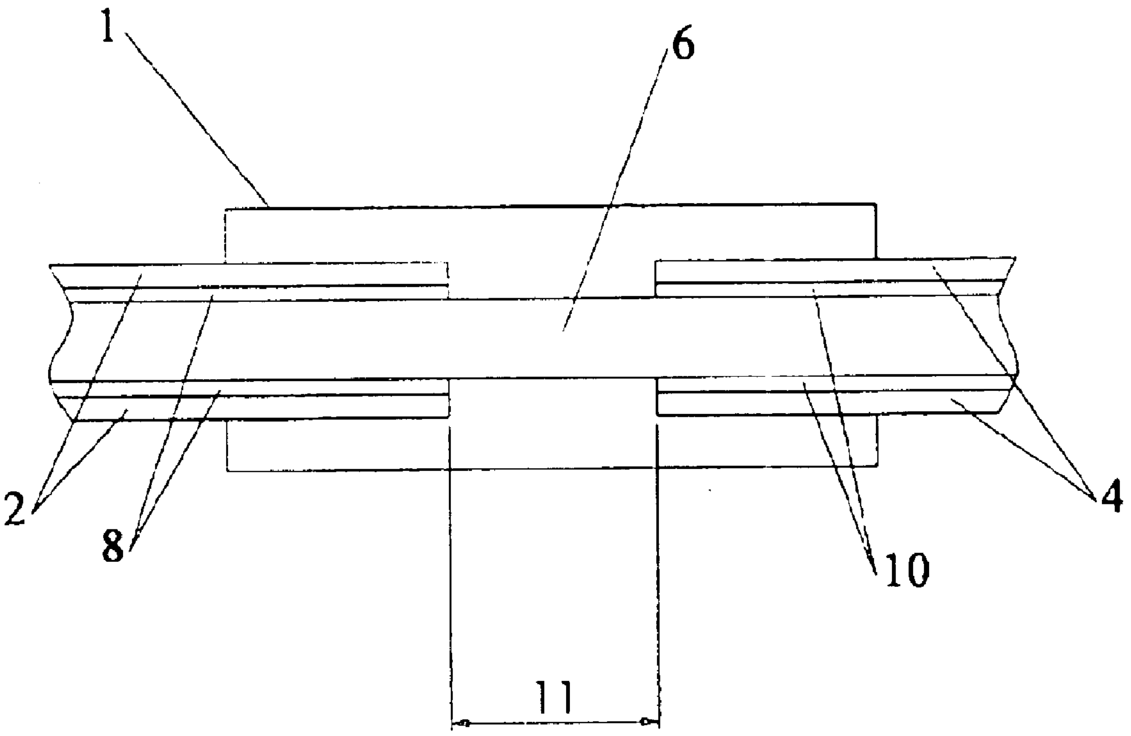
FIG. 1 shows a schematic section view of a basic configuration of the enlarged section.

Referring to FIG. 1, a basic embodiment of a moisture barrier in accordance with the present invention is described. Layers 2 and 4 may surround a core 6. Between the surrounding layers 2, 4 and the core 6 may be a gap 8, 10. Moisture may be present in gap 8. Along an exposed core section 11 a molded housing 1 encapsulates snugly the core 6 such the gap 8, 10 terminate at the boundaries of the exposed section 11. The moisture barrier is configured such that no moisture may reach gap 10. The core 6 is preferably a metallic conductor and the surrounding layers 2 and 4 are well-known non conductive insulation materials used for cable insulation.

It is noted that the gap 8 and/or 10 may have any configuration allowing moisture to creep along it. This may be also the case where the insulation layer 2 and/or 4 contact the core 6 and/or the core layer 7 (see FIGS. 2, 3, 4).

Figure 2:
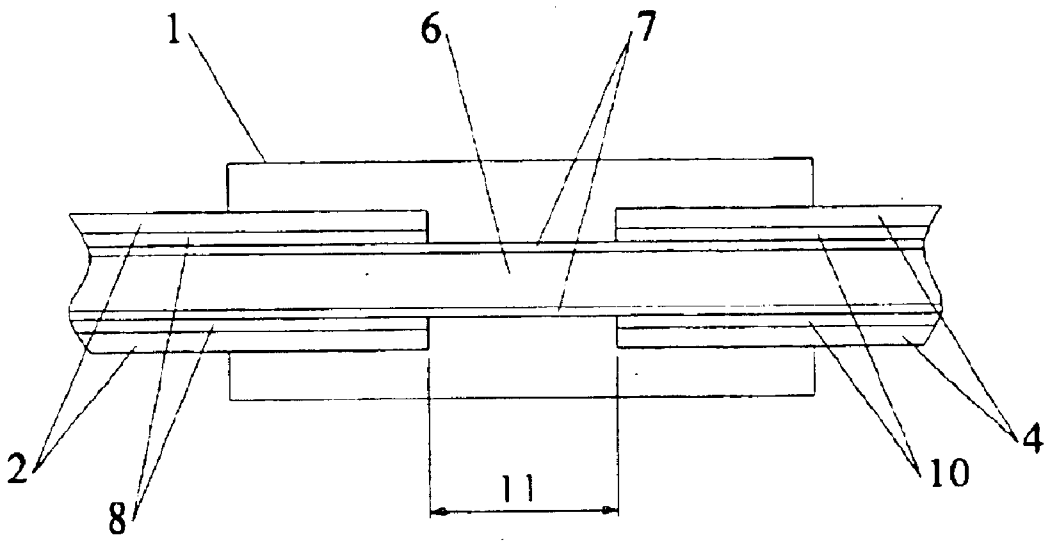
FIG. 2 depicts a schematic section view according to FIG. 1 with the core having a core layer continuing along the exposed section.

Now turning to FIG. 2 an embodiment is described where the core 6 has a core layer 7. As can be seen, the core layer 7 continues along the exposed section 11 and provides an uninterrupted coating of the core 6. The housing 1 snugly contacts the layer 7 along the exposed section 11. A layer 7 may be utilized in cases where the core 6 includes a number of conductors as is in the case of tinsel wire.

Figure 3:
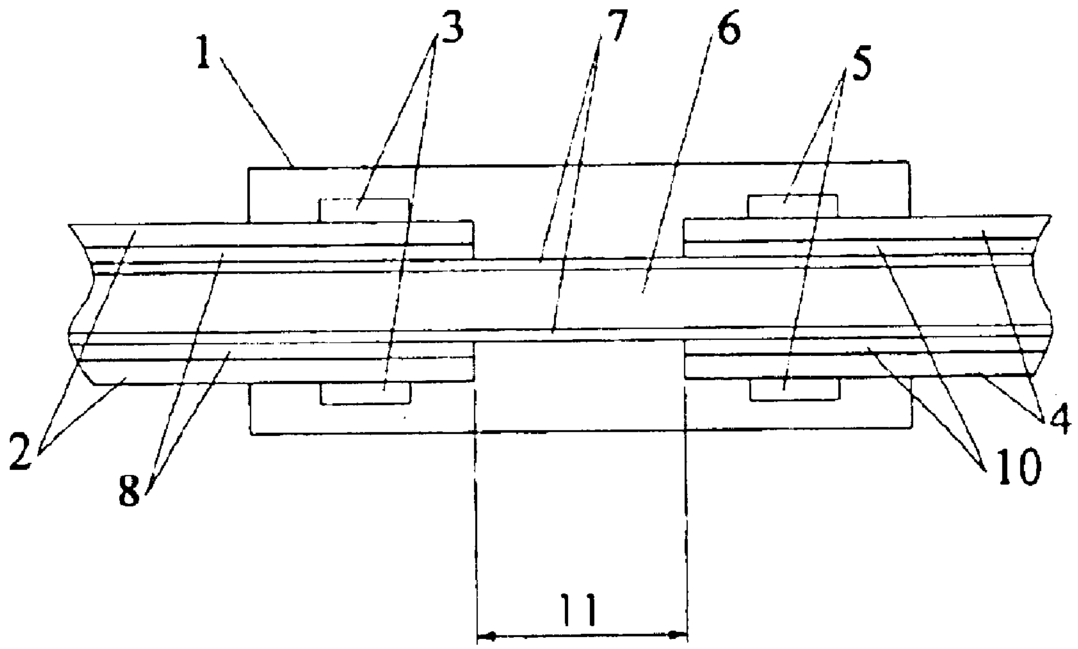
FIG. 3 illustrates a schematic section view according to FIG. 2 with additional crimped sleeves placed lateral of the exposed section.

In the embodiments of FIGS. 1 and 2, the molded housing 1 mainly operates as a moisture barrier. In FIG. 3 an embodiment is depicted where the molded housing 1 additionally provides structural support. For that purpose, metal sleeves 3, 5 are crimped around the surrounding layers 2, 4 in a well-known fashion. The sleeves 3, 5 fixedly hold on to the surrounding layers 2, 4. The housing 1 is molded around the sleeves 3, 5. As a result, externally imposed strain is transmitted via the sleeves 3 and/or 5 onto the housing 1 and the exposed section 11 may remain free of mechanical stress.

Figure 4:
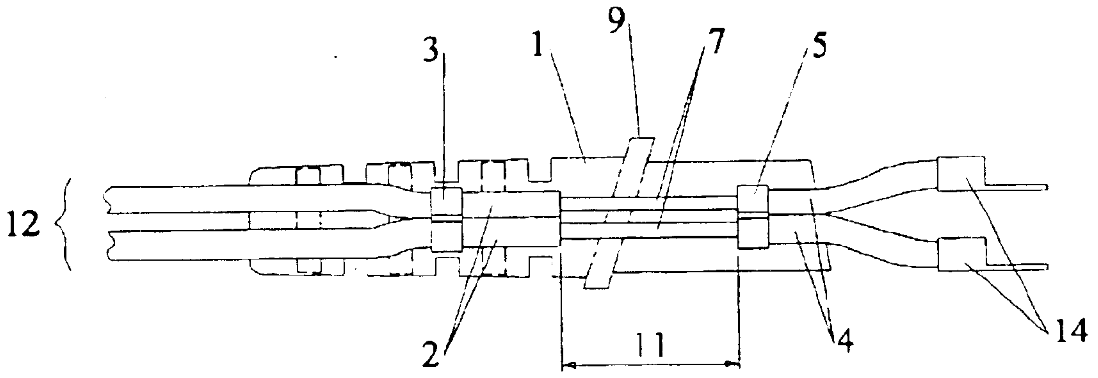
FIG. 4 shows an exemplary configuration of the extended section.

In FIG. 4, an embodiment is illustrated in which the molded housing 1 is additionally configured as a well-known wick dam. Thereby, the exposed section 11 is placed at the rigid portion of the wick dam. As can be seen in FIG. 4, the rigid portion may feature a flange section 9 that interlocks with a correspondingly shaped opening of a device housing 20 (see FIG. 6). FIG. 4 also shows crimped lugs 14, which may be connected to internal terminals of a measurement device. The moisture barrier prevents moisture eventually present between the core layer 7 and the surrounding layer 2 from reaching the crimped lugs 14.

The surrounding layers 2 and 4 may be made of braided nylon or any other well-known plastic that may be used for electrical insulation. The core layer 7 may be of a plastic material commonly traded under the name "Teflon". With a heatstripper or any other suitable tool the surrounding layer 2, 4 are cut at the boundary of the exposed section 11. The use of a heatstripper prevents damage of the core layer 7, which has a significantly higher melting point than the outside layers 2, 4. In that way damage to the core layer 7 and an unintentional moisture bridge between core 6 and core layer 7 is avoided.

Once the exposed section 11 is prepared and the sleeves 3, 5 are crimped on, the cable string 12 is inserted in a mold and the housing 1 is molded in a well-known fashion. An exemplary material of housing 1 may be polyvinyl chloride traded under the name "PVC". The housing 1 may be also fabricated from two separately molded halves that are fused together. The two halves may be potted and/or sealed with a curing resin and/or an insulating liquid. The two halves may feature a well-known snapping mechanism for holding them together.

The placement of the sleeves 3, 5 on both sides of the exposed section 11 uniquely divides tensile strain onto the sleeves 3, 5. This is possible, since the surrounding layer 2 is physically disconnected from the surrounding layer 4. Hence, the sleeve 3 transmits mainly strain from the surrounding layer 2 onto the housing 1, whereas the sleeve 5 transmits mainly externally induced strain from the core 6 via the layer 4 onto the housing 1. This is particularly advantageous in reducing the risk of ripping the layer 2.

Figure 5:
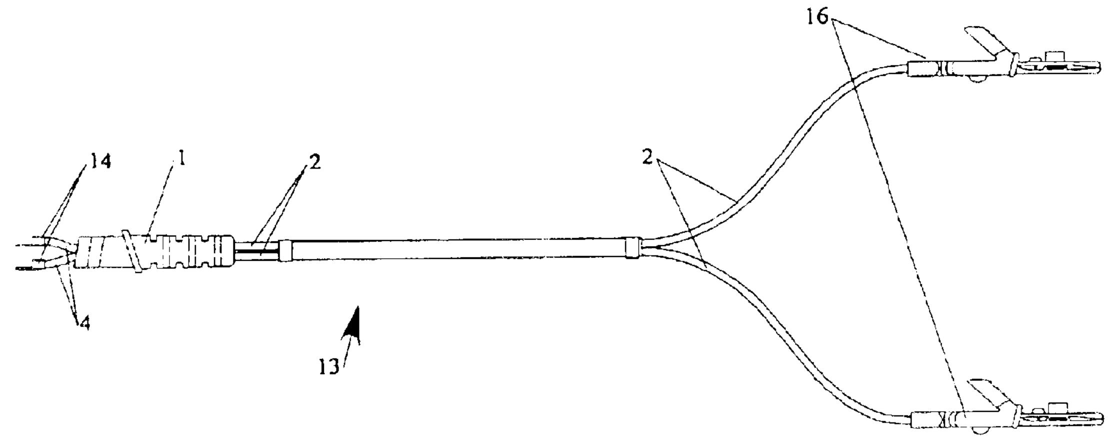
FIG. 5 depicts an exemplary test cord.

FIG. 5 shows a final test cord 13 with the housing 1 in the configuration of a wick dam. The test cord 13 has clamps 16 on the outside cable ends. The clamps 16 provide temporary connection to test contacts at which measurements need to be performed. Moisture may enter the gap 8 where the clamps are attached at their respective cores 6.

Figure 6:
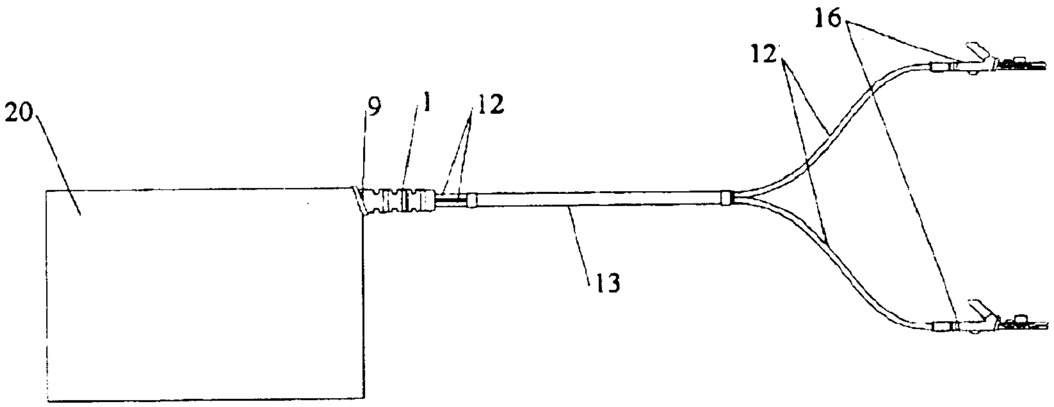
FIG. 6 illustrates a measurement device having a test cord of the present invention.

In FIG. 6, the test cord 13 is shown assembled together with a device housing 20 of a well-known measurement device.

Now, referring to FIGS. 7–12 a second embodiment of the present invention including a strain relief bridge are described in detail.

Figure 7:
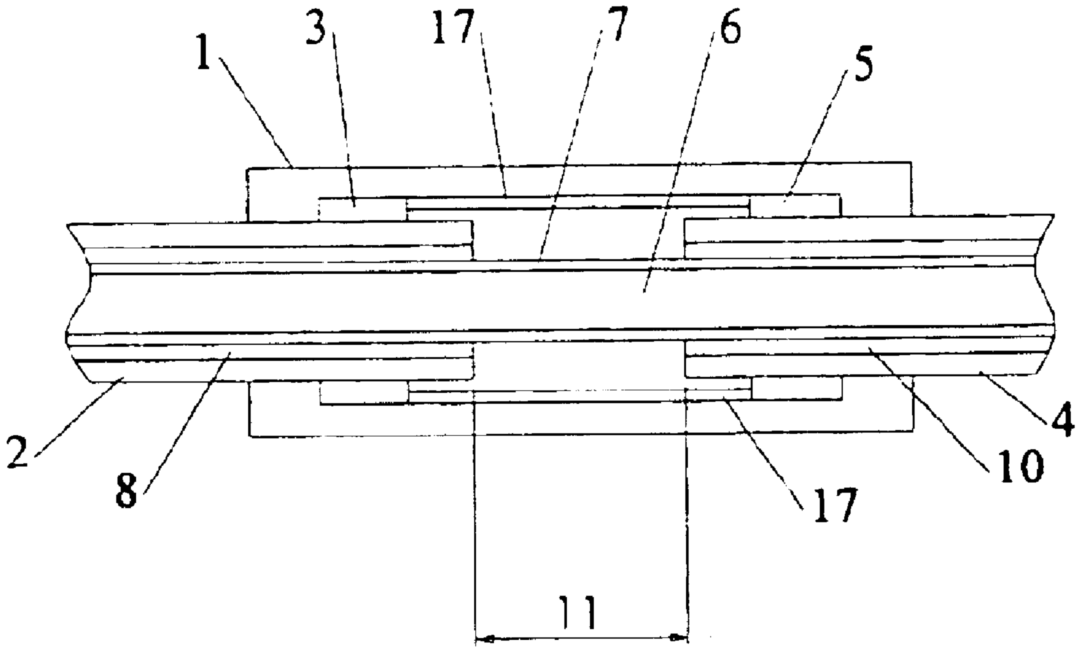
FIG. 7 illustrates a schematic section view according to FIG. 3 with the crimped sleeves being directly connected by bridging structures according to a second embodiment of the invention.

In FIG. 7 it is schematically depicted, how the introduction of a strain relief bridge assists in bridging strain across the exposed core section 11. As described above, two metal sleeves 3, 5 are crimped on the surrounding insulation layer 4 adjacent to the exposed core section 11. A bridging structure 17 is directly connected to both metal sleeves 3, 5 and bridging across the exposed core section 11. The bridging structure 11 is configured to provide an even transmission of strain between the two sleeves 3, 5 and at the same time provides sufficient spacing for a reliable forming of the moisture barrier as described in the above.

Figure 8:
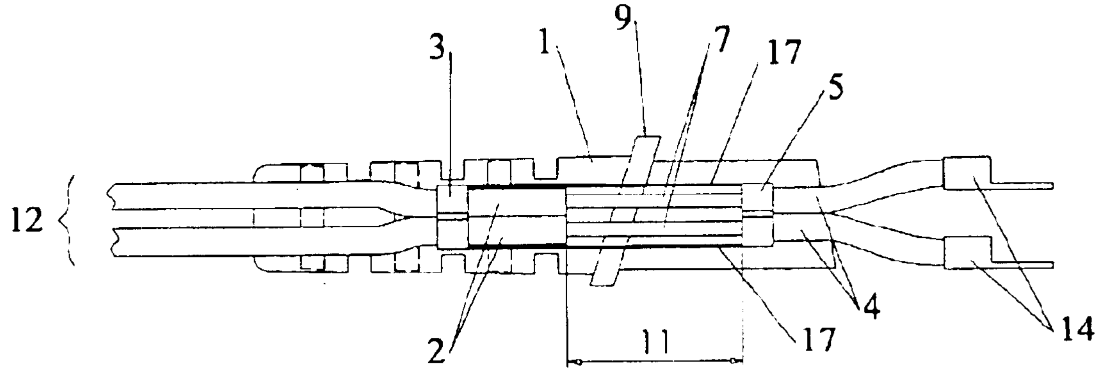
FIG. 8 shows an exemplary configuration of the extended section with the bridging structures.

FIG. 8 illustrates how the bridging structure 17 also conforms to outside shape constraints of the wick dam's housing 1 such that well known design features of the wick dam may be easily formed into the outside shape of the molded housing 1.

Figure 9:
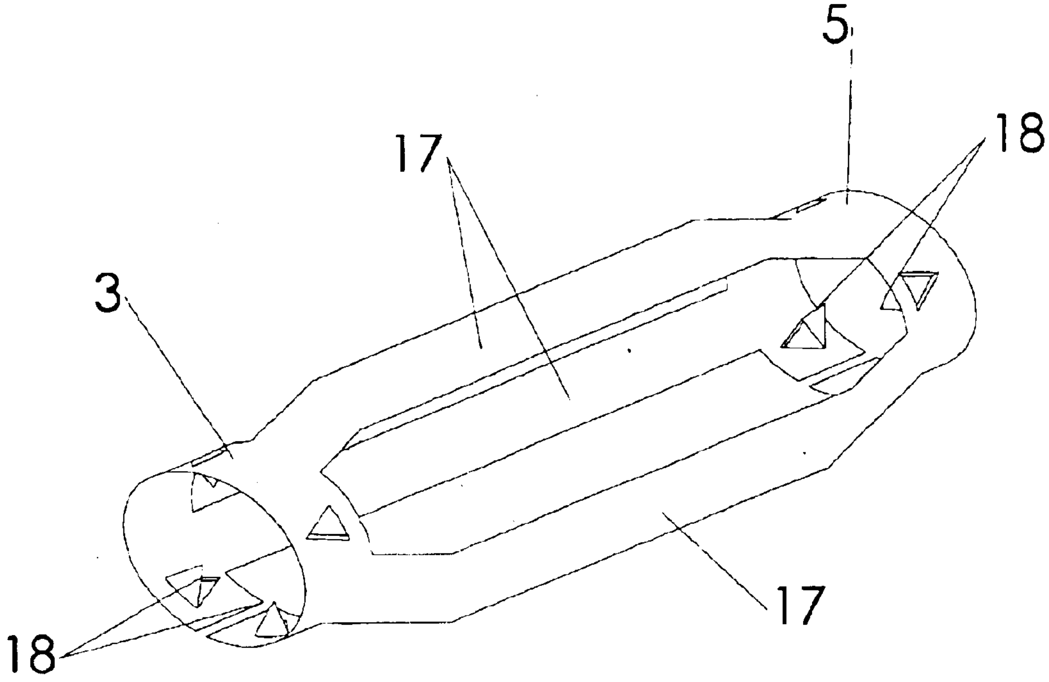
FIG. 9 depicts an exemplary configuration of a monolithically fabricated strain relief bridge in a simplified assembled form where the strain relief bridge is crimped.
Figure 10:
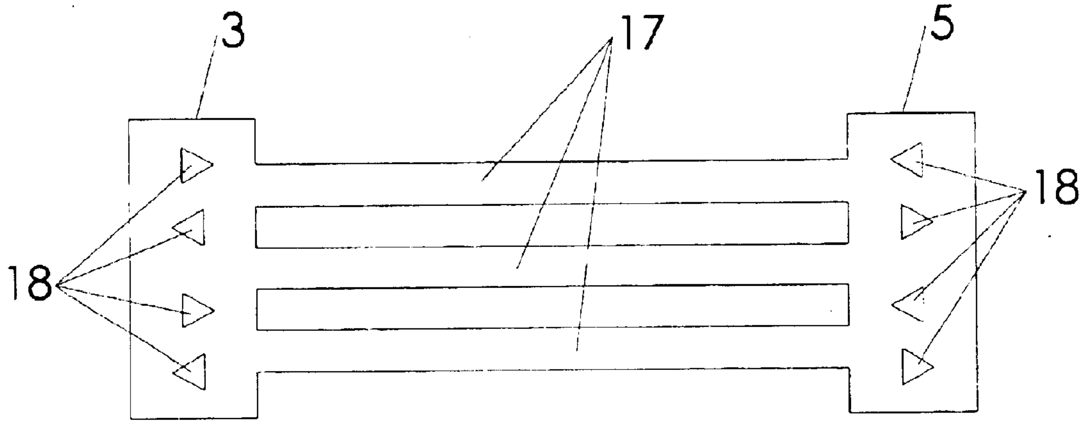
FIGS. 10, 11 illustrate top and front view of the monolithic strain relief bridge according to FIG. 9 at a preliminary fabrication stage.
Figure 11:
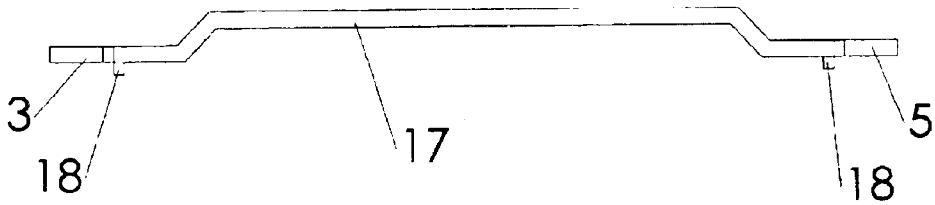

Referring to FIGS. 9–11, a first embodiment of the strain relief bridge is described. In that context, FIG. 9 illustrates three dimensionally a monolithically fabricated strain relief bridge. The sleeves 3 and 5 are depicted in approximately crimped-on configuration, where claws 18 protrude towards the center of the sleeves 3, 5. The bridging structure 17 includes preferably a number of separate beams circumferentially bridging between the two sleeves 3, 5. The beams are positioned in a substantially circumferentially continuous fashion along the sleeves' 3, 5 circumference such that strain and/or force received from one of the sleeves 3, 5 is evenly transmitted onto the other of the two sleeves 3, 5. Thereby it is assured that a force applied to the test cord 13 does not result in inadvertent bending of moisture barrier as that would be the case with well known prior art rotationally asymmetric crimping lugs. In addition, the beams provide sufficient spacing such that during the co-molding of the moisture barrier an even and reliable filling of the exposed core section 11 is assured.

FIGS. 10, 11 show a top and a front view of a preliminary fabrication stage of the strain relief according to FIG. 9. As it can be seen, the monolithic strain relief bridge may be fabricated from flat sheet metal. After the individual elements like the beams and the claws 18 are stamped out and/or bent into the sheet metal the sleeves 3, 5 may be rolled around and/or crimped on the insulator layers 4 in a well known fashion and the strain relief bridge is brought into its final assemble configuration. The material separations in the bridging structure 17 warrant that the bending and/or crimping is not inhibited by the bridging structure 17.

Figure 12:
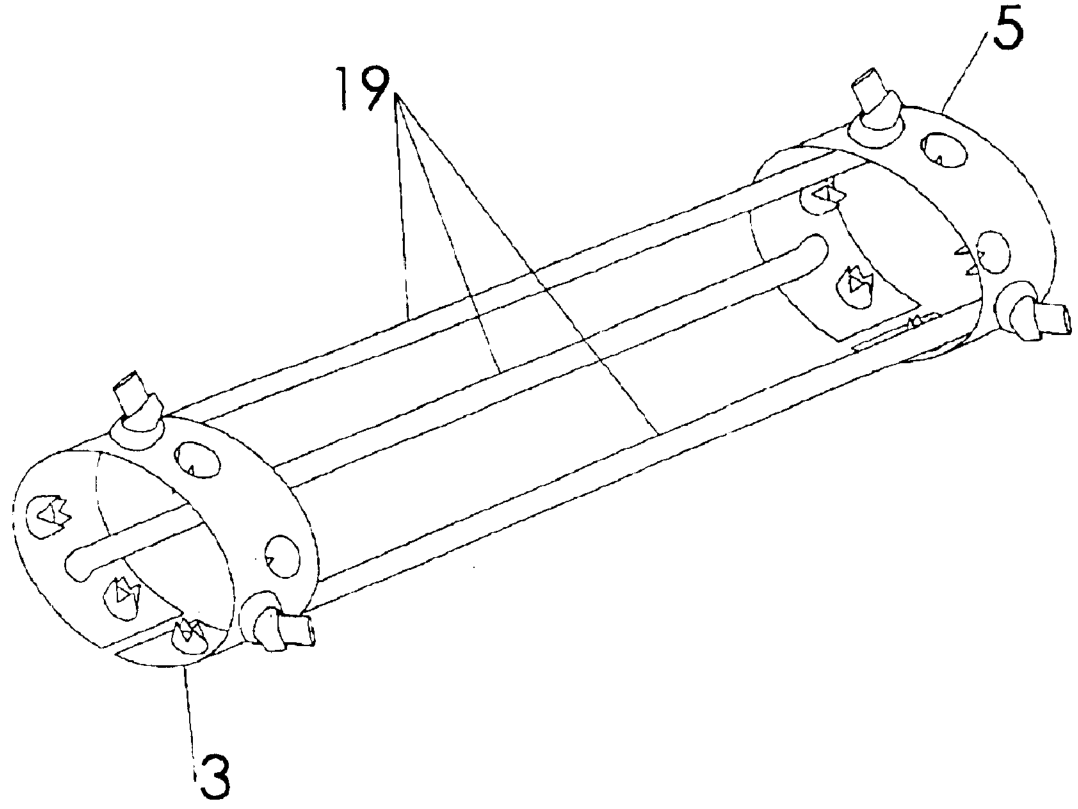
FIG. 12 shows another configuration of the strain relief bridge with flexible members being attached as bridging structures between two metal sleeves.

FIG. 12 depicts an alternate embodiment of the strain relief bridge, where the bridging structure 17 is provided by flexible members 19. This embodiment varies from the monolithic strain relief bridge in as much as additional bending flexibility is added to the strain relief bridge by replacing the beams with flexible members 19. The flexible members 19 are preferably made of braided nylon strings that loop through and/or are attached to holes of the sleeves 3, 5. According to FIG. 12, the flexible members are preferably attached to the sleeves 3, 5 by having their ends inserted in holes of the sleeves 3, 5 and sufficiently enlarged in diameter such that the ends of flexible members 19 are prevented from being pulled out of the holes. The diameter may be enlarged by simply making knots into the flexible members' 19 ends. The flexible members 19 may be made of any well known means for transmitting a pulling force while remaining flexible to bending.

Figure 13:
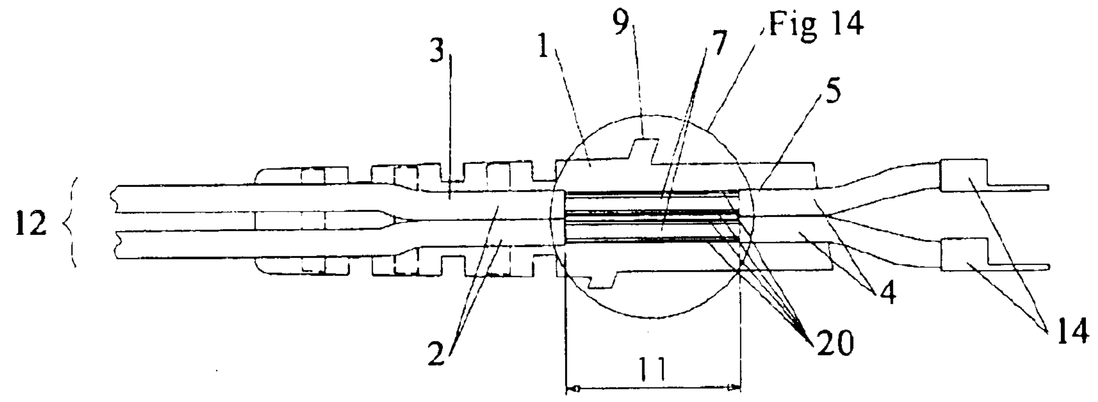
FIG. 13 shows a third embodiment of the invention in which a strain relief bridge is provided by a braided nylon layer of the cables.
Figure 14:
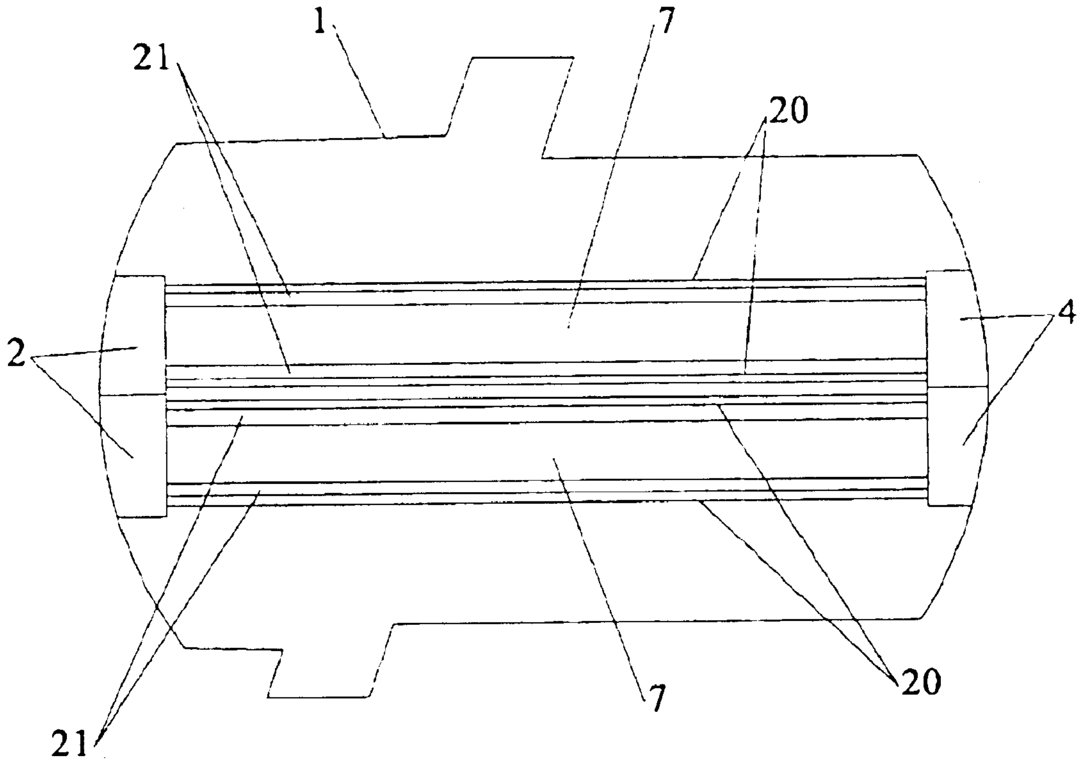
FIG. 14 depicts a detail view of FIG. 13.

Now turning to FIGS. 13 and 14 a third embodiment of the invention is explained in detail. In the third embodiment, an integral bridging structure 20 may be provided as an integral part of a well known braided nylon layer concentrically placed within the surrounding layers 2, 4. A braided nylon layer is part of the cable 12 for additional tensile strength of it. The braided nylon layer is made from a number of nylon strings circumferentially braided along the core layer 7.

The integral bridging structure 20 is formed by compacting and or straddling the braided nylon strings along the exposed core section 11 substantially without cutting or breaking any of the nylon strings. In that fashion, tensile force applied to one end is transmitted in a continuous fashion across the moisture barrier. Compacting and/or straddling the braided nylon strings provides for sufficient access to the core layer 7 along the exposed section 11 such that the space around the core layer 7 is readily accessible for forming a sealing structure 21.

The sealing structure 21 may be fabricated by molding and/or resin casting. The sealing structure 21 may reach through gaps between the integral bridging structure 20 for improved interlocking with the housing 1 molded and/or resin cast in the following as described in the above.

The scope of the invention is not limited to a particular shape of the sleeves 3, 5. As it may be appreciated by anybody skilled in the art, the sleeves may have a non-round shape as it may knowingly result from crimping the sleeves 3, 5.

Accordingly, the scope of the invention described in the specification above is set forth by the following claims and their legal equivalent:

What is claimed is:

1. A strain relief bridge for bridging between two crimping locations, said strain relief bridge comprising:

a. two metal sleeves each of which configured for an independent crimping on one of said two crimping locations; and b. a bridging structure positioned with respect to said metal sleeves substantially without inhibiting a crimping of said metal sleeves, said bridging structure being positioned in between said metal sleeves and being connected to said metal sleeves in a substantially circumferentially continuous fashion along a circumference of each of said metal sleeves;

such that at least one of a tensile force and a tensile strain is evenly transmitted by said bridging structure between said circumference of each of said two metal sleeves.

2. The strain relief bridge of claim 1, wherein said strain relief bridge is monolithically fabricated from sheet metal.

3. The strain relief bridge of claim 1, wherein said bridging structure comprises flexible members.

4. The strain relief bridge of claim 3, wherein at least one of said flexible members is made of braided nylon attached to holes of said metal sleeves.

5. A moisture barrier for preventing moisture from propagating along a gap between a core layer and a surrounding layer, said moisture barrier comprising:

a. an exposed core section along which said surrounding layer is removed;

b. a strain relief bridge including:

i. two metal sleeves;

ii. a bridging structure rotationally symmetric connecting said two metal sleeves in assembled configuration substantially without inhibiting a crimping of said metal sleeves;

wherein said strain relief bridge is fixedly crimped with said metal sleeves on said surrounding layer laterally to both ends of said exposed core section such that a force externally applied on said insulation layer is received by a first of said two metal sleeves and bridged across said exposed core section via said bridging structure and via a second of said metal sleeves in a substantially circumferentially continuous fashion; and c. a molded housing snugly encompassing said exposed section and said strain relief bridge such that said moisture is substantially barred from said propagating.

6. The moisture barrier at claim 5, wherein said strain relief bridge is monolithically fabricated from sheet metal.

7. The moisture barrier of claim 5, wherein said bridging structure comprises flexible members.

8. The moisture barrier of claim 7, wherein at least one of said flexible members is made of braided nylon attached to holes of said metal sleeves.

9. A test cord comprising:

a. an electrical conductor configured for transmitting a voltage from a peripheral contact to an electrical terminal of an electrical device;

b. an insulator layer surrounding said conductor between said peripheral contact and one end of an exposed core section;

c. a strain relief bridge including:

i. two metal sleeves;

ii. a bridging structure rotationally symmetric connecting said two metal sleeves in assembled configuration substantially without inhibiting a crimping of said metal sleeves;

wherein said strain relief bridge is fixedly crimped with said metal sleeves on said surrounding layer laterally to both ends of said exposed core section such that a force externally applied on said insulation layer is received by a first of said two metal sleeves and bridged across said exposed core section via said bridging structure and via a second of said metal sleeves in a substantially circumferentially continuous fashion;

d. a molded housing snugly encompassing said exposed core section such that a gap between said conductor and said insulator layer terminates at said molded housing and such that moisture eventually present in said gap is prevented from propagating beyond said gap towards said terminal; and wherein said molded housing is part of a wick dam that snugly seals a correspondingly shaped opening of said electrical device.

10. The test cord of claim 9, wherein said strain relief bridge is monolithically fabricated from sheet metal.

11. The test cord of claim 9, wherein said bridging structure comprises flexible members.

12. The test cord of claim 11, wherein at least one of said flexible members is made of braided nylon attached to holes of said metal sleeves.

13. An electrical testing device comprising:

a. a device housing having an opening for accessing internal terminal;

b. a test cord comprising:

i. an electrical conductor configured for transmitting a voltage from a peripheral contact to an electrical terminal of an electrical device;

ii. an insulator layer surrounding said conductor between said peripheral contact and one end of an exposed core section;

iii. a strain relief bridge including:

1. two metal sleeves;

2. a bridging structure rotationally symmetric connecting said two metal sleeves in assembled configuration substantially without inhibiting a crimping of said metal sleeves;

wherein said strain relief bridge is fixedly crimped with said metal sleeves on said surrounding layer laterally to both ends of said exposed core section such that a force externally applied on said insulator layer is received by a first of said two metal sleeves and bridged across said exposed core section via said bridging structure and via a second of said metal sleeves in a substantially circumferentially continuous fashion; and iv. a wick dam snugly encompassing said exposed core section such that a gap between said conductor and said insulator layer terminates at wick dam and such that moisture eventually present in said gap is prevented from propagating beyond said gap towards said terminal, wherein said wick dam has an outside shape that is snugly held in said opening.

14. The electrical testing device of claim 13, wherein said strain relief bridge is monolithically fabricated from sheet metal.

15. The electrical testing device of claim 13, wherein said bridging structure comprises flexible members.

16. The electrical testing device of claim 15, wherein at least one of said flexible members is made of braided nylon attached to holes of said metal sleeves.

17. A moisture barrier for preventing moisture from propagating along a gap between a core layer and a surrounding layer, said moisture barrier comprising:

a. an exposed core section along which said surrounding layer is removed;

b. an integral bridging structure integrally formed from nylon strings concentrically braided within the surrounding layer;

c. a sealing structure molded between said core layer and said integral bridging structure such that said moisture is substantially barred from said propagating; and d. a molded housing snugly encompassing said integral bridging structure and said sealing structure.

18. A test cord comprising:

a. an electrical conductor configured for transmitting a voltage from a peripheral contact to an electrical terminal of an electrical device;

b. an insulator layer surrounding said conductor between said peripheral contact and one end of an exposed core section;

c. a braided nylon layer of nylon strings concentrically braided within said insulator layer d. an exposed core section along which said insulator layer is removed;

e. an integral bridging structure integrally formed from said nylon strings;

f. a sealing structure molded between a core layer and said integral bridging structure such that a gap between said conductor and said insulator layer terminates at a molded housing and such that moisture eventually present in said gap is prevented from propagating beyond said gap towards said terminal, wherein said; molded housing snugly encompasses said integral bridging structure and said sealing structure; and wherein said molded housing is part of a wick darn that snugly seals a correspondingly shaped opening of said electrical device.

19. An electrical testing device comprising:

a. a device housing having an opening for accessing internal terminals;

b. a test cord comprising:

i. an electrical conductor configured for transmitting a voltage from a peripheral contact to an electrical terminal of an electrical device;

ii. an insulator layer surrounding said conductor between said peripheral contact and one end of an exposed core section;

iii. a braided nylon layer of nylon strings concentrically braided within said insulator layer iv. an exposed core section along which said insulator layer is removed;

v. an integral bridging structure integrally formed from said nylon strings;

vi. a sealing structure molded between a core layer and said integral bridging structure such that a gap between said conductor and said insulator layer terminates at a molded housing and such that moisture eventually present in said gap is prevented from propagating beyond said gap towards said terminal, wherein said molded housing snugly encompasses said integral bridging structure and said sealing structure; and wherein said molded housing is part of a wick dam that snugly seals a correspondingly shaped opening of said electrical device.

* * * * *